United States Patent
Vasey et al.

(10) Patent No.: US 8,820,849 B2
(45) Date of Patent: Sep. 2, 2014

(54) LINEPAN AND LONGWALL MINING MACHINE

(75) Inventors: Ron Vasey, Powick (GB); Adrian Jones, Malvern (GB)

(73) Assignee: Joy MM Delaware, Inc., Wilmington, DE (US)

( * ) Notice: Subject to any disclaimer, the term of this patent is extended or adjusted under 35 U.S.C. 154(b) by 98 days.

(21) Appl. No.: 13/480,729

(22) Filed: May 25, 2012

(65) Prior Publication Data
US 2013/0313887 A1    Nov. 28, 2013

(51) Int. Cl.
E21C 35/12    (2006.01)
E21C 35/20    (2006.01)

(52) U.S. Cl.
CPC ............... *E21C 35/12* (2013.01); *E21C 35/20* (2013.01)
USPC .......................................................... 299/43

(58) Field of Classification Search
CPC ................................................... E21F 13/066
USPC ......................................... 299/42, 43, 45, 46
See application file for complete search history.

(56) References Cited

U.S. PATENT DOCUMENTS

| | | | |
|---|---|---|---|
| 3,473,846 A * | 10/1969 | Lanfermann et al. | 299/43 |
| 4,063,781 A * | 12/1977 | Georg et al. | 299/34.11 |
| 4,067,619 A * | 1/1978 | Peters et al. | 299/43 |
| 4,108,495 A | 8/1978 | Hauschopp et al. | |
| 4,256,345 A * | 3/1981 | Schwarting et al. | 299/43 |
| 4,359,154 A * | 11/1982 | Temme | 198/735.2 |
| 4,372,618 A * | 2/1983 | Pearey | 299/31 |
| 4,373,757 A * | 2/1983 | Gehle et al. | 299/43 |
| 4,458,951 A * | 7/1984 | Merten et al. | 299/43 |
| 4,462,637 A * | 7/1984 | Rafael et al. | 299/32 |
| 4,474,411 A | 10/1984 | Peters et al. | |
| 4,492,410 A * | 1/1985 | Schlusener et al. | 299/43 |
| 4,561,697 A * | 12/1985 | Hauschopp | 299/43 |
| 4,637,510 A | 1/1987 | Tomlinson | |

(Continued)

FOREIGN PATENT DOCUMENTS

| | | |
|---|---|---|
| AU | 2002302577 | 11/2003 |
| CN | 1625642 | 6/2005 |

(Continued)

OTHER PUBLICATIONS

Search Report from the United Kingdom Intellectual Property Office for Application No. GB1309148.3 dated Nov. 14, 2013 (3 pages).

*Primary Examiner* — David Bagnell
*Assistant Examiner* — Michael Goodwin
(74) *Attorney, Agent, or Firm* — Michael Best & Friedrich LLP

(57) ABSTRACT

A longwall mining machine and a linepan section, the linepan section may include a face-side rail, a gob-side rail opposite the face-side rail, and a conveyor pan between the face-side rail and the gob-side rail. The face-side rail may have a generally horizontal top surface at a top surface height and with a top surface width, an angled loading surface extending toward the mining face and the ground surface and arranged at an oblique angle relative to the top surface, the loading surface being at a loading height and with a loading surface width, the loading surface width being at least about 25 percent of the total width, and a material cavity defined in the face surface below the loading surface and recessed toward a gob-side.

20 Claims, 10 Drawing Sheets

(56) References Cited

U.S. PATENT DOCUMENTS

| | | | |
|---|---|---|---|
| 4,643,296 | A | 2/1987 | Braun et al. |
| 4,776,637 | A * | 10/1988 | Dawson .................. 299/1.6 |
| 6,179,386 | B1 * | 1/2001 | Meya et al. .................. 299/43 |
| 6,896,121 | B2 | 5/2005 | Vorsteher et al. |
| 6,966,429 | B2 | 11/2005 | Vorsteher et al. |
| 7,188,441 | B2 | 3/2007 | Merten et al. |
| 7,392,896 | B2 | 7/2008 | Wirtz et al. |
| 7,399,039 | B2 | 7/2008 | Bettermann et al. |
| 7,896,444 | B2 | 3/2011 | Tout et al. |
| 8,128,176 | B2 | 3/2012 | Klabisch et al. |
| 2005/0126891 | A1 | 6/2005 | Wirtz et al. |
| 2007/0205007 | A1 | 9/2007 | Bettermann et al. |

FOREIGN PATENT DOCUMENTS

| | | |
|---|---|---|
| CN | 100378292 | 4/2008 |
| CN | 101663462 | 3/2010 |
| CZ | 301999 | 12/2004 |
| DE | 3223575 | 7/1983 |
| DE | 202007006122 | 7/2008 |
| DE | 112008000670 | 4/2010 |
| EP | 1497535 | 1/2005 |
| GB | 2028750 | 3/1980 |
| GB | 2096671 | 10/1982 |
| GB | 2390074 | 12/2003 |
| RU | 2276726 | 5/2006 |
| WO | 03091541 | 11/2003 |
| WO | 2008131867 | 11/2008 |

* cited by examiner

LINEPAN AND LONGWALL MINING MACHINE

FIELD

The present invention generally relates to longwall mining machines and, more particularly, to a linepan for an armoured face conveyor.

SUMMARY

In a longwall mining machine, a shearer traverses along an armoured face conveyor (AFC) pan line to win material from the face. The AFC includes several linepan sections connected together to form a conveyor for moving cut material away from the face. An exemplary AFC including linepan sections or conveyor pans is disclosed in U.S. Pat. No. 7,896,444, issued Mar. 1, 2011, the entire contents of which are hereby incorporated by reference.

AFC linepans for low and medium seam applications can be prevented from advancing by compaction of cut material between the face side of the pan and the cut face of the material being cut. This can be caused by poor loading characteristics of the pan and the inability of the coal cutting machine to load the cut material through the small aperture available between the underside of the coal cutting machine arm and the top of the AFC linepan. The compaction of cut material also causes horizon control problems (vertical steering problems) with the AFC pan-line as a whole which may cause delays in production.

In some independent aspects, a new profile is provided for the front casting of the linepan. For example, the new profile may have an angled loading surface (e.g., a 45 degree loading angle) instead of the typical vertical face (e.g., 90 degree face). With the angled loading surface, a loading aperture is created between the cutting machine arm, that carries the cutting elements, and the conveying area of the AFC. This may improve loading characteristics both of the cutting machine and of the cut material, allowing the material to flow easily over the face side of the AFC linepan when the linepan is advanced towards the face. This may be applicable to low profile, low height AFC applications where AFC control is important.

In one independent embodiment, a linepan section of a longwall mining machine positioned proximate a mining face and supported on a ground surface is provided, and the linepan section may generally include a face-side rail, a gob-side rail, and a conveyor pan between the face-side rail and the gob-side rail. The face-side rail may generally have a generally horizontal top surface with a top face-side end and a top gob-side end and being at a top surface height, a top surface length being defined in a gob-to-face direction between the top gob-side end and the top face-side end, an angled loading surface extending from the top face-side end toward the mining face and the ground surface and arranged at an oblique angle relative to the top surface, the loading surface with a loading face-side end at a loading height, a loading surface length being defined in the gob-to-face direction between the top face-side end and the loading face-side end, a total length being defined in the gob-to-face direction between the top gob-side end and the loading face-side end, the loading surface length being at least about 25 percent of the total length, and a material cavity defined in the face surface below the loading surface and recessed from the loading face-side end toward a gob-side and extending past the top face-side end to a cavity bottom surface.

In another independent embodiment, a longwall mining machine positioned proximate a mining face and supported on a ground surface is provided, and the machine may generally include a shearer including a cutting head for cutting into the mining face, a body, and a haulage assembly for moving the shearer along the mining face; an armoured face conveyor; a haulage member extending along the length of the mining face and engaged with the haulage assembly of the shearer; and an advancing assembly including a ram that advances the armoured face conveyor toward the mining face.

The armoured face conveyor may generally include a plurality of linepans connected along the mining face, and a conveyor. Each linepan may generally include a face-side rail, a gob-side rail opposite the face-side rail, and a conveyor pan between the face-side rail and the gob-side rail. The face-side rail may generally have a generally horizontal top surface with a top face-side end and a top gob-side end and being at a top surface height, a top surface length being defined in a gob-to-face direction between the top gob-side end and the top face-side end, an angled loading surface extending from the top face-side end toward the mining face and the ground surface and arranged at an oblique angle relative to the top surface, the loading surface with a loading face-side end at a loading height, a loading surface length being defined in the gob-to-face direction between the top face-side end and the loading face-side end, a total length being defined in the gob-to-face direction between the top gob-side end and the loading face-side end, the loading surface length being at least about 25 percent of the total length, and a material cavity defined in the face surface below the loading surface and recessed from the loading face-side end toward a gob-side and extending past the top face-side end to a cavity bottom surface.

In yet another independent embodiment, a linepan section may generally include a face-side rail; a gob-side rail opposite the face-side rail; and a conveyor pan between the face-side rail and the gob-side rail. The face-side rail may generally have a generally horizontal top surface with a top face-side end and a top gob-side end and being at a top surface height, a top surface length being defined in a gob-to-face direction between the top gob-side end and the top face-side end, an angled loading surface extending from the top face-side end toward the mining face and the ground surface and arranged at an oblique angle relative to the top surface, the loading surface with a loading face-side end at a loading height, a loading surface length being defined in the gob-to-face direction between the top face-side end and the loading face-side end, a total length being defined in the gob-to-face direction between the top gob-side end and the loading face-side end, the loading surface length being at least about 25 percent of the total length, a material cavity defined in the face surface below the loading surface and recessed from the loading face-side end toward a gob-side and extending past the top face-side end to a cavity bottom surface, conveyor recesses defined in a surface opposite the face surface and extending a depth to recess bottom surface, the top face-side end being positioned closer to the mining face than the recess bottom surface, and a toe-rider flange extending toward the mining face from a bottom edge of the material cavity, the toe-rider flange extending past the loading face-side end and defining a flange surface, a total height being defined between the flange surface and the top surface height, a loading surface height being defined between the flange surface and the loading height, the loading height being less than about 80 percent of the total height.

Other independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
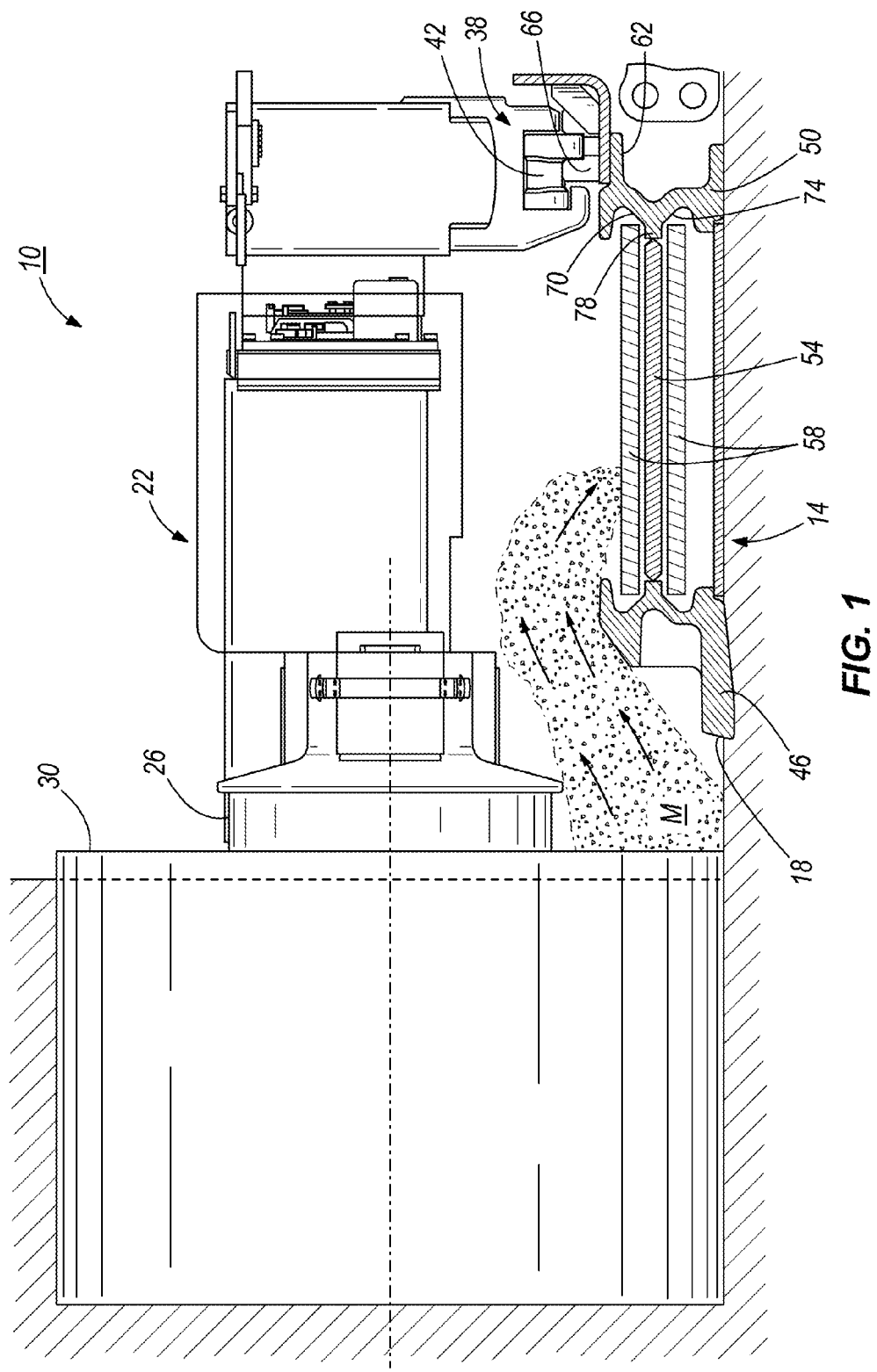
FIG. 1 is a partial cross-sectional view of a longwall mining machine including a shearer and an armoured face conveyor with a linepan section.

FIG. 1 shows a longwall mining machine 10 including an armoured face conveyor (AFC) 14, with linepan sections 18 (one shown), and a shearer 22. The shearer 22 includes a cutting drum 26 for cutting material M (e.g., coal) from a mining face 30 and a shoe 34 (see FIG. 7) that rides on the AFC 14 to support the shearer 22. As shown in FIG. 1, a haulage assembly 38 includes a drive sprocket 42 for pulling the shearer 22 along the mining face 30.

Each linepan section 18 of the AFC 14 includes a face-side rail 46, a gob-side rail 50 and a conveyor pan 54 between the rails 46, 50. The AFC 14 also includes a conveyor 58 moving along the conveyor pan 54. The gob-side rail 50 defines a rack support 62 that supports a haulage member in the form of a rack 66.

In some constructions (such as the illustrated construction), each rail 46, 50 is formed as a single-piece casting to include structure(s) discussed below in more detail. Each rail 46, 50 defines an upper conveyor recess 70 and a lower conveyor recess 74 and includes a conveyor pan portion 78 that engages the conveyor pan 54. The illustrated conveyor pan 54 is a substantially flat plate connected (e.g., welded) to the conveyor pan portion 78 of each rail 46, 50. The rails 46, 50 and the conveyor pan 54, when assembled, form a linepan section 18, and a plurality of linepan sections 18 are connected together with locking keys (not shown) to form a continuous AFC 14 along the mining face 30.

The upper conveyor recesses 70 and the lower conveyor recesses 74 of the rails 46, 50 cooperate to provide an upper conveyor path and a lower conveyor path for the conveyor 58. The conveyor 58 is formed as a closed loop around the conveyor pan 54 and is driven by a drive motor (not shown) to convey material M from the mining face 30 on the top surface of the conveyor pan 54.

Figure 2:
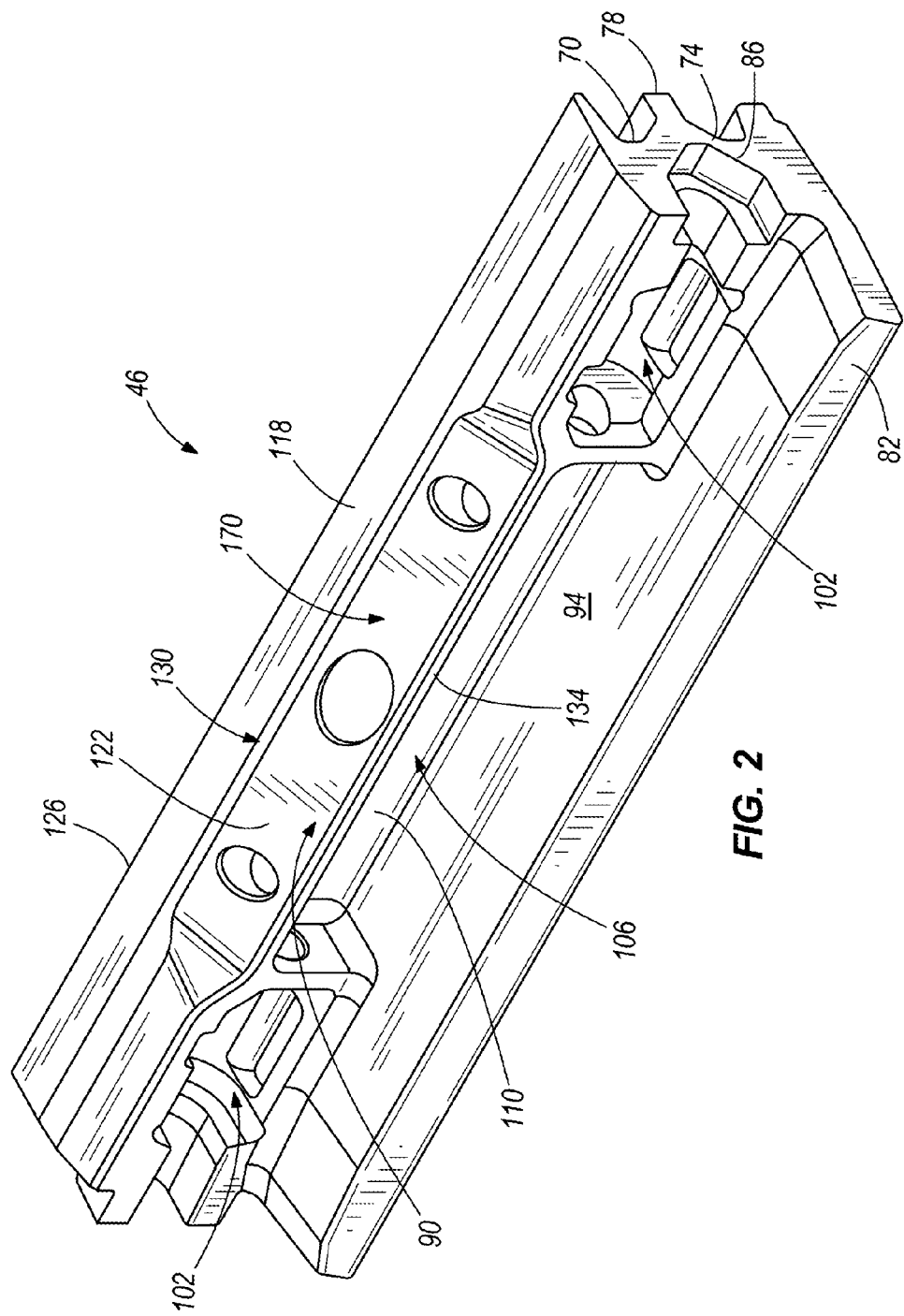
FIG. 2 is an enlarged perspective view of a face-side rail of the linepan section shown in FIG. 1.
Figure 3:
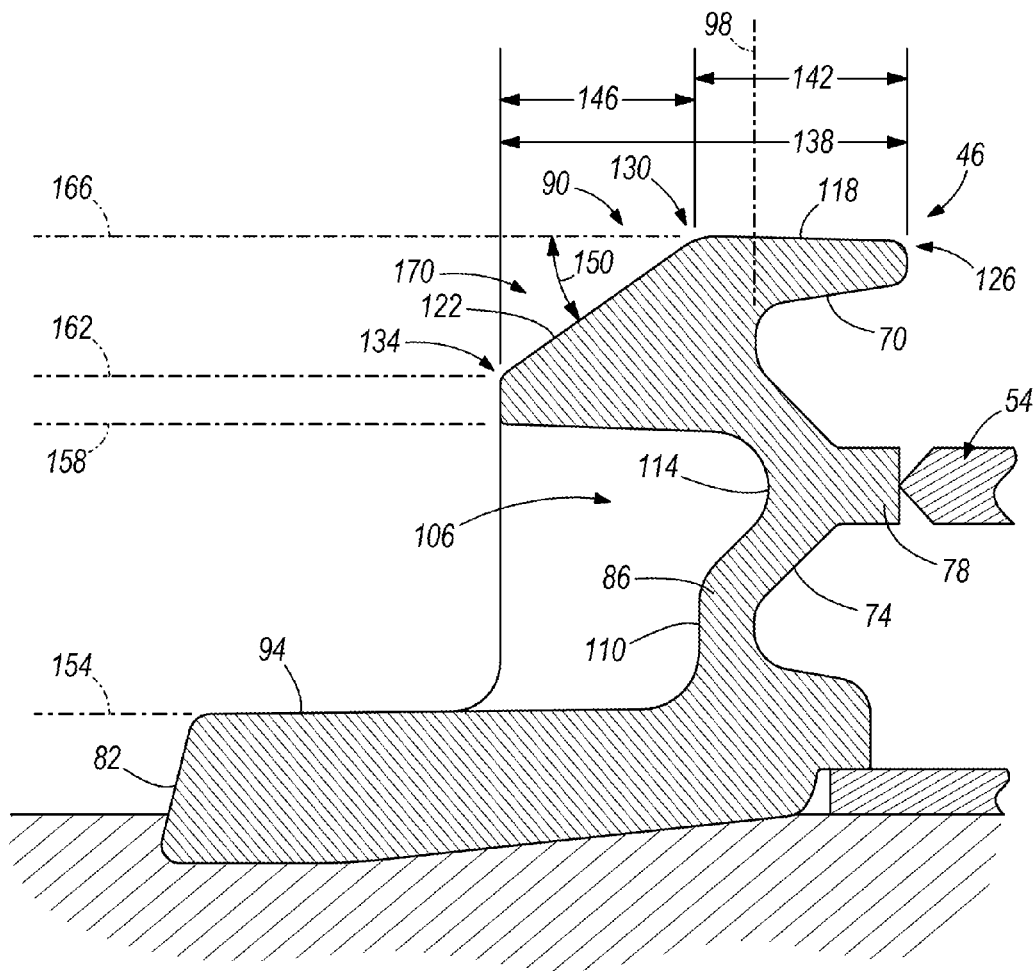
FIG. 3 is an enlarged partial cross-sectional view of the face-side rail shown in FIG. 2.

As discussed below in more detail, the illustrated face-side rail 46 is constructed to generally facilitate loading of material M cut from the mining face 30 onto the conveyor pan 54. Referring to FIGS. 2-3, the face-side rail 46 generally includes a toe-rider flange 82, a body portion 86 and a loading portion 90.

Figure 7:
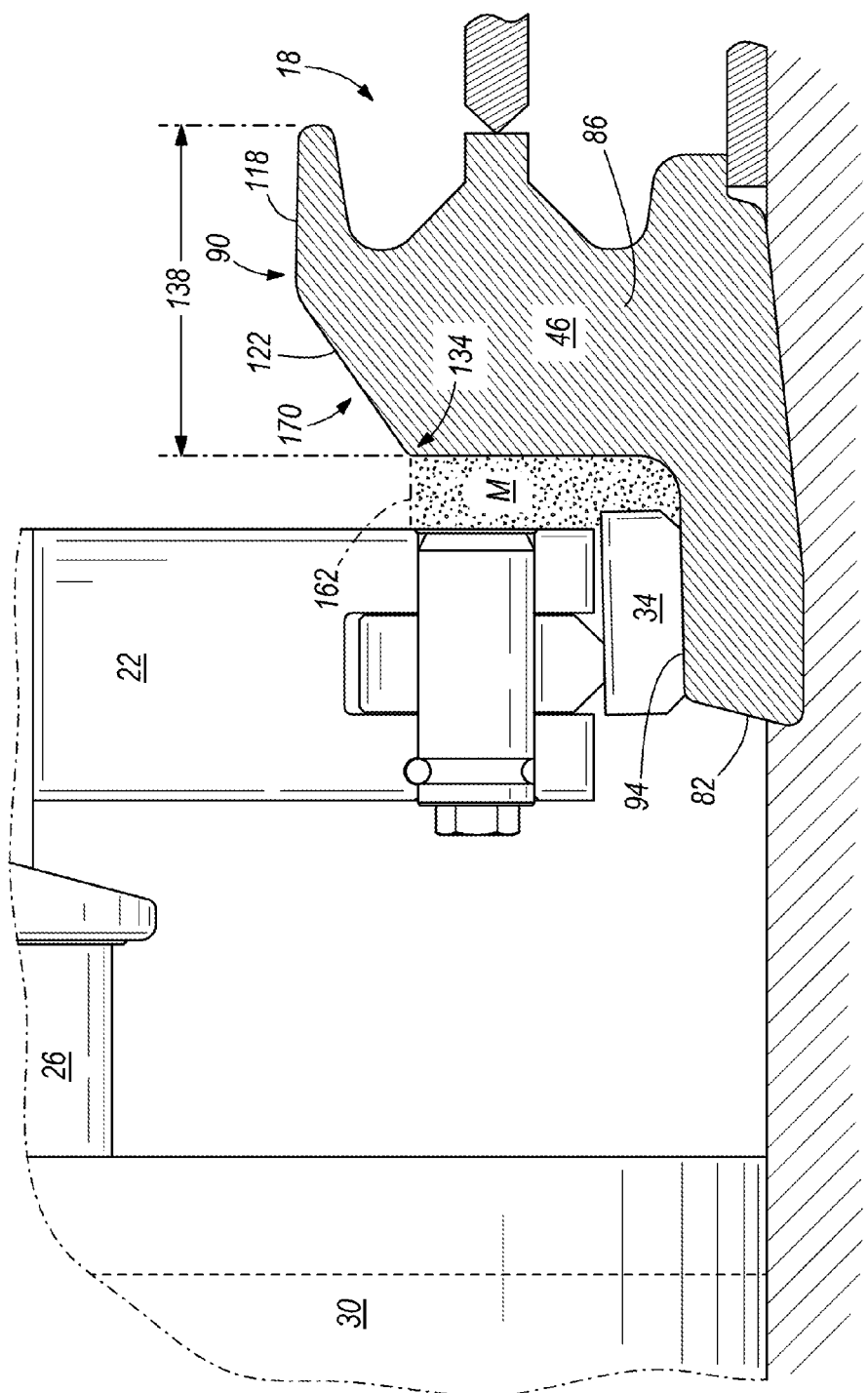
FIG. 7 is an end view of the face-side rail of FIG. 2 with a portion of the mining machine of FIG. 1.

As shown in FIG. 3, the toe-rider flange 82 supports the face-side rail 46 on the ground and defines a flange surface 94 that slidingly supports the shoe 34 (see FIG. 7). The flange surface 94 is (see FIG. 3) substantially horizontal or parallel to the ground. The body portion 86 extends upwardly from the toe-rider flange 82. The body portion 86 defines the conveyor recesses 70, 74 which extend into the body portion 86 toward the face 30 to a face-side extremity 98. The body portion 86 also provides the conveyor pan portion 78. Coupling portions 102 are arranged to receive a locking key to connect adjacent face-side rails 46 together to form the continuous AFC 14.

Figure 5:
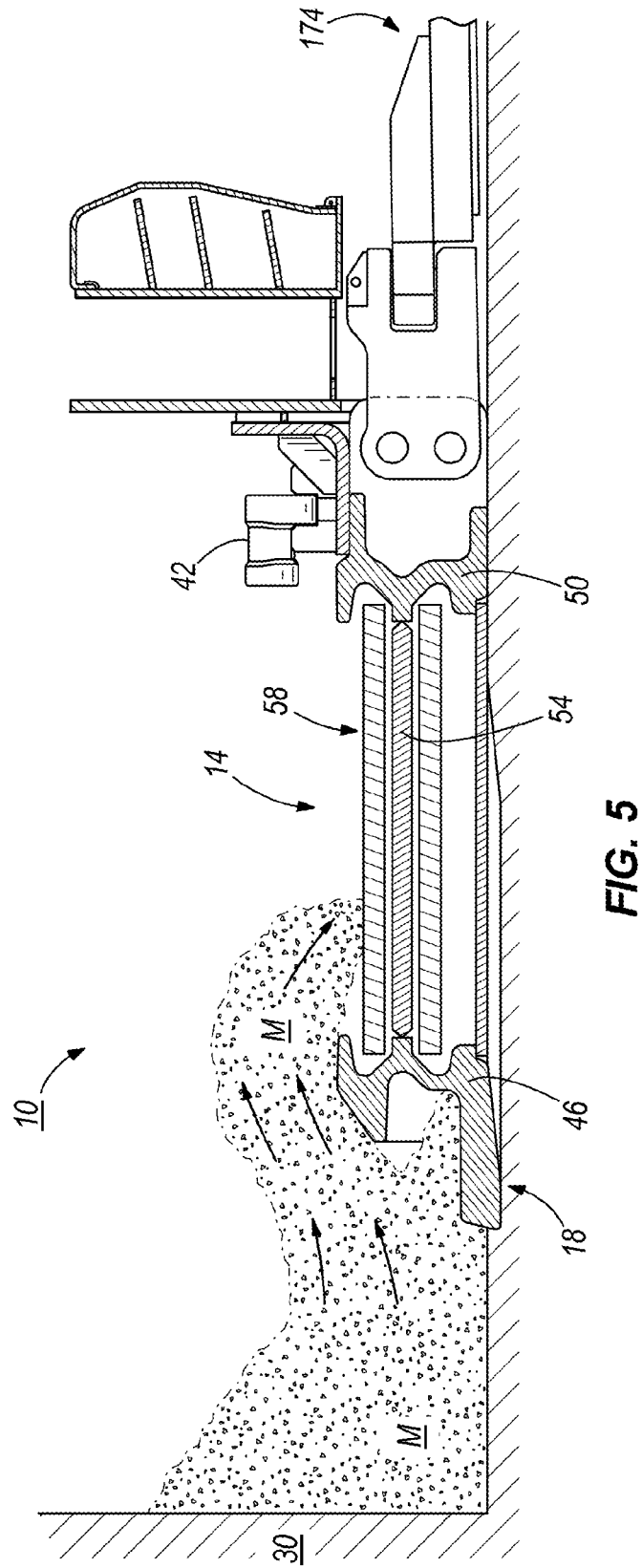
FIG. 5 is a partial cross-sectional sectional view of the mining machine shown in FIG. 1, illustrating an advancing action.
Figure 6:
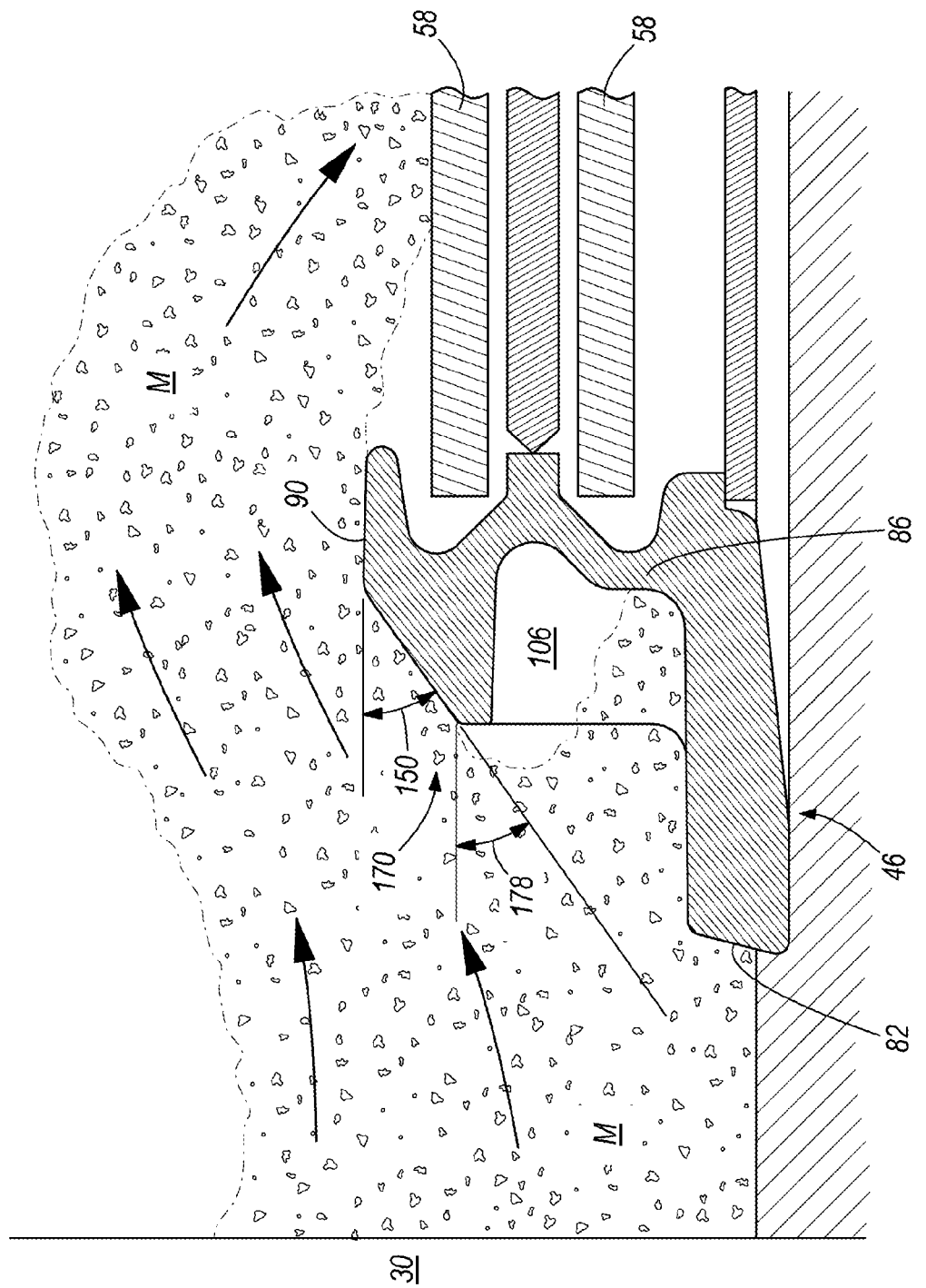
FIG. 6 is an enlarged partial cross-sectional view of a portion of the machine shown in FIG. 5, illustrating the linepan section in more detail.

A material cavity 106 is defined in the body portion 86 between the flange surface 94 and the loading portion 90. The loading portion 90 bounds the top of the material cavity 106. As shown in FIGS. 5-6, material M collects and is compacted in the material cavity 106 to form a ramp for cut material. In the illustrated construction (see FIG. 3), the body portion 86 defines a contoured surface 110 opposite the recesses 70, 74 and the conveyor pan portion 78. The illustrated contour substantially follows the shape of the recesses 70, 74 and the conveyor pan portion 78. In other embodiments, the surface 110 could have a different shape (e.g., a straight ramp shape or multiple angled portions (see, e.g., the "double dozer" profile shown in FIG. 8)).

The material cavity 106 extends into the body portion 86 toward the gob-side to a gob-side extremity 114. In the illustrated construction, a portion of the conveyor recesses 70, 74 and the material cavity 106 overlap (e.g., the material cavity 106 extends toward the gob-side beyond the face-side extremity 98 of the conveyor recesses 70, 74, and the conveyor recesses 70, 74 extend toward the face 30 beyond the gob-side extremity 114 of the material cavity 106). In the illustrated construction, the gob-side extremity 114 is generally horizontally in-line with the conveyor pan portion 78.

Further details of the face-side rail 46 will be discussed with reference to FIG. 3. In this description, up, down, left, right, vertical and horizontal are as viewed in FIG. 3. The loading portion 90 is connected to the body portion 86 and has a top surface 118 and a loading surface 122. The loading surface 122 is arranged and extends between the two coupling portions 102. In the illustrated construction, the material cavity 106 extends below the entire loading surface 122 and below a portion of the top surface 118. Also, in the illustrated construction, with respect to the face-side extremity 98 of the conveyor recesses 70, 74, a substantial majority of length the loading portion 90 on the face-side is angled.

A top gob-side end 126 is defined proximate the gob-side extremity of the top surface 118. A top face-side end 130 is defined at a transition from the horizontal top surface 118 to the angled loading surface 122. A loading face-side end 134 is defined proximate the face-side extremity of the loading surface 122 (the face-side extremity of the upper portion of the face-side rail 46).

A total width 138 of the upper surface of the loading portion 90 is defined (in a generally horizontal plane) between the loading face-side end 134 and the top gob-side end 126. A top surface width 142 is defined in between the top gob-side end 126 and the top face-side end 130, and a loading surface width 146 is defined (in a generally horizontal plane) between the loading face-side end 134 and the top face-side end 130.

The loading face width 146 is at least about 25 percent and, more particularly, at least about 40 percent of the total width 138. In the illustrated embodiment, the loading surface width 146 is about 50 percent (e.g., about 48 percent) of the total width 138. In other words, the top surface width 142 is no more than about 75 percent and, more particularly, no more than about 60 percent of the total width 138. In the illustrated embodiment, the top surface width 142 is about 50 percent (e.g., about 52 percent) of the total width 138.

A loading angle 150 is defined between at least a portion of the loading surface 122 and at least a portion of the top surface 118. In the illustrated construction, the top surface 118 and the loading surface 122 are each substantially linear, and the loading angle 150 is defined between the linear portions of the surfaces 118, 122.

The loading angle 150 is between about 25 degrees and 55 degrees and, more particularly, between about 30 degrees and about 50 degrees. The illustrated loading angle 150 is about 45 degrees. In the illustrated construction, the loading surface 122 is arranged such that a plane defined by the loading surface 122 does not intersect the toe rider flange 82.

A flange height 154 is defined in a generally horizontal plane with the flange surface 94. A material cavity height 158 is defined in a vertical direction between the top surface of the material cavity 106 (or the bottom surface of the loading portion 90) and the flange surface 94. A loading height 162 is defined in the vertical direction between the lowermost point of the loading surface 122 (e.g., at the loading face-side end 134) and the flange surface 94. A top surface height 166 is defined in the vertical direction between the top surface 118 and the flange surface 94.

The material cavity height 158 is less than about 80 percent and, more particularly, less than about 70 percent of the top surface height 166. The illustrated material cavity height 158 is about 60 percent (e.g., about 61 percent) of the top surface height 166.

The loading height 162 is less than about 85 percent and, more particularly, 75 percent of the top surface height 166. The illustrated loading height 162 is about 70 percent (e.g., about 71 percent) of the top surface height 166.

Figure 4:
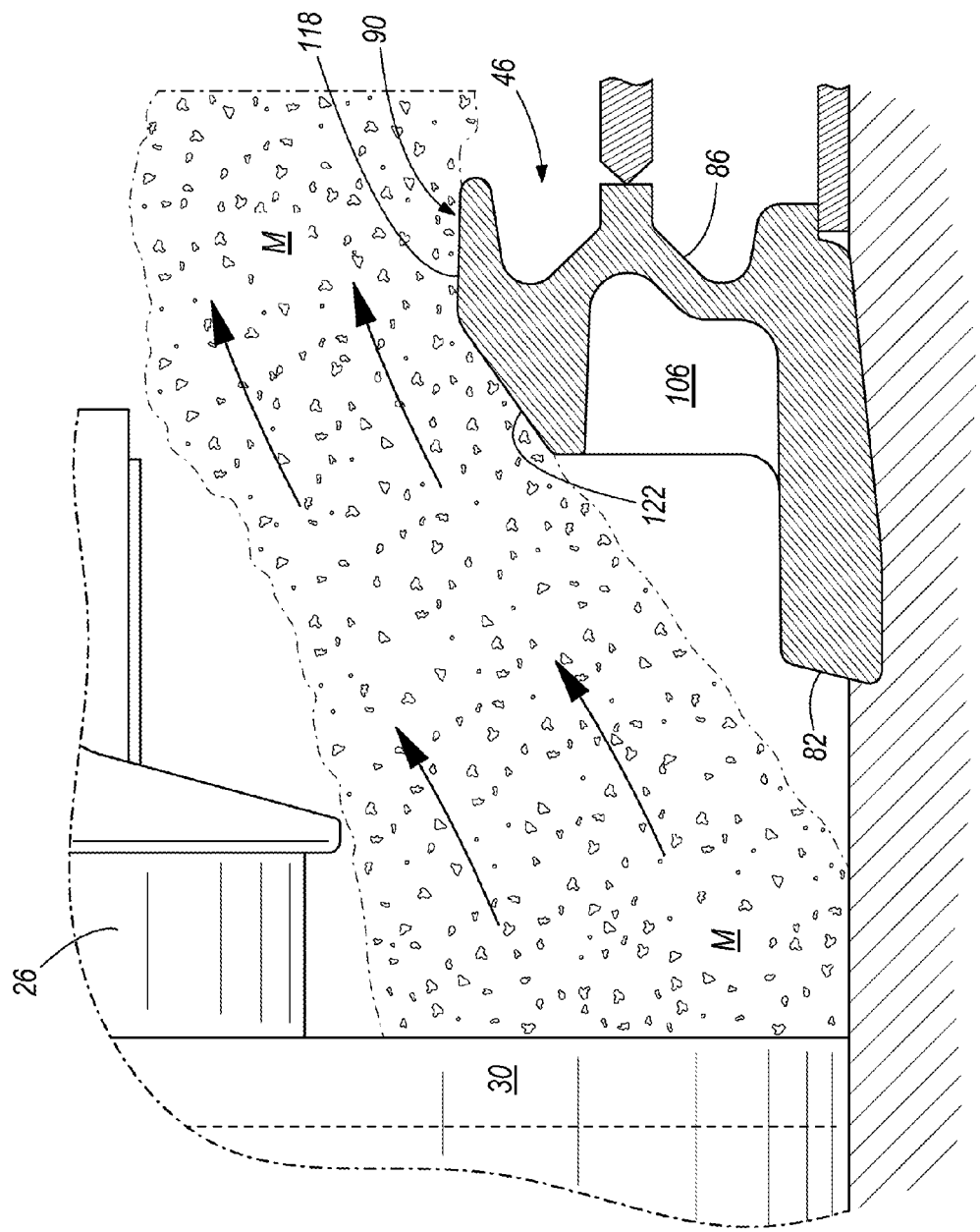
FIG. 4 is an enlarged partial cross-sectional view of a portion of the machine shown in FIG. 1, illustrating the linepan section in more detail.

During a cutting operation (see FIGS. 1 and 4), the shearer 22 rotates the cutting drum 26 to cut material M from the mining face 30. As the material M is cut, the cutting drum 26 also pushes the material M toward the AFC 14. The loading portion 90 provides a substantially increased loading aperture 170 between the face-side rail 46 and the shearer 22. As such, the material M easily loads onto the conveyor pan 54 even in low seam height installations (e.g., 3 meters or less). FIGS. 1 and 4 show the material M being cut away from the mining face 30 and loaded onto the AFC 14 by the shearer 22.

During an advancing operation (see FIGS. 5-6), the AFC 14 is advanced into the remaining pile of material M with a hydraulic ram 174. The hydraulic ram 174 pushes the AFC toward the mining face 30 such that the material M is forced over the face-side rail 46 and onto the conveyor pan 54. The material cavity 106 and the angled loading surface 122 cooperate with the toe-rider flange 82 to provide a dynamic loading ramp. Material M collects in the material cavity 106 and mounds down onto the toe-rider flange 82 such that a smooth ramp of material M at substantially the same angle 178 as the angle 150 of the loading surface 122 is formed. The angled loading surface 122 and/or the material cavity 106 allow smooth and effective loading of the material M onto the conveyor pan 54.

As the material M flows over the face-side rail 46, a downward force is exerted on the face-side rail 46. The angled loading surface 122, the ramp of material M, and the resultant downward force provides a more stable AFC 14 during the advancing operation. In other words, the AFC 14 is less likely to ride up on or drift vertically up the pile of material M as the AFC 14 advances into the pile of material M. Instead, the AFC 14 maintains stable contact with the floor and moves smoothly into the pile of material M. Additionally, with the angled loading surface 122, the AFC 14 compacts the pile of material M less than prior art AFCs during the advancing operation. FIGS. 5-6 show the material M flowing over the face-side rail 46 during the advancing operation.

Figure 8:
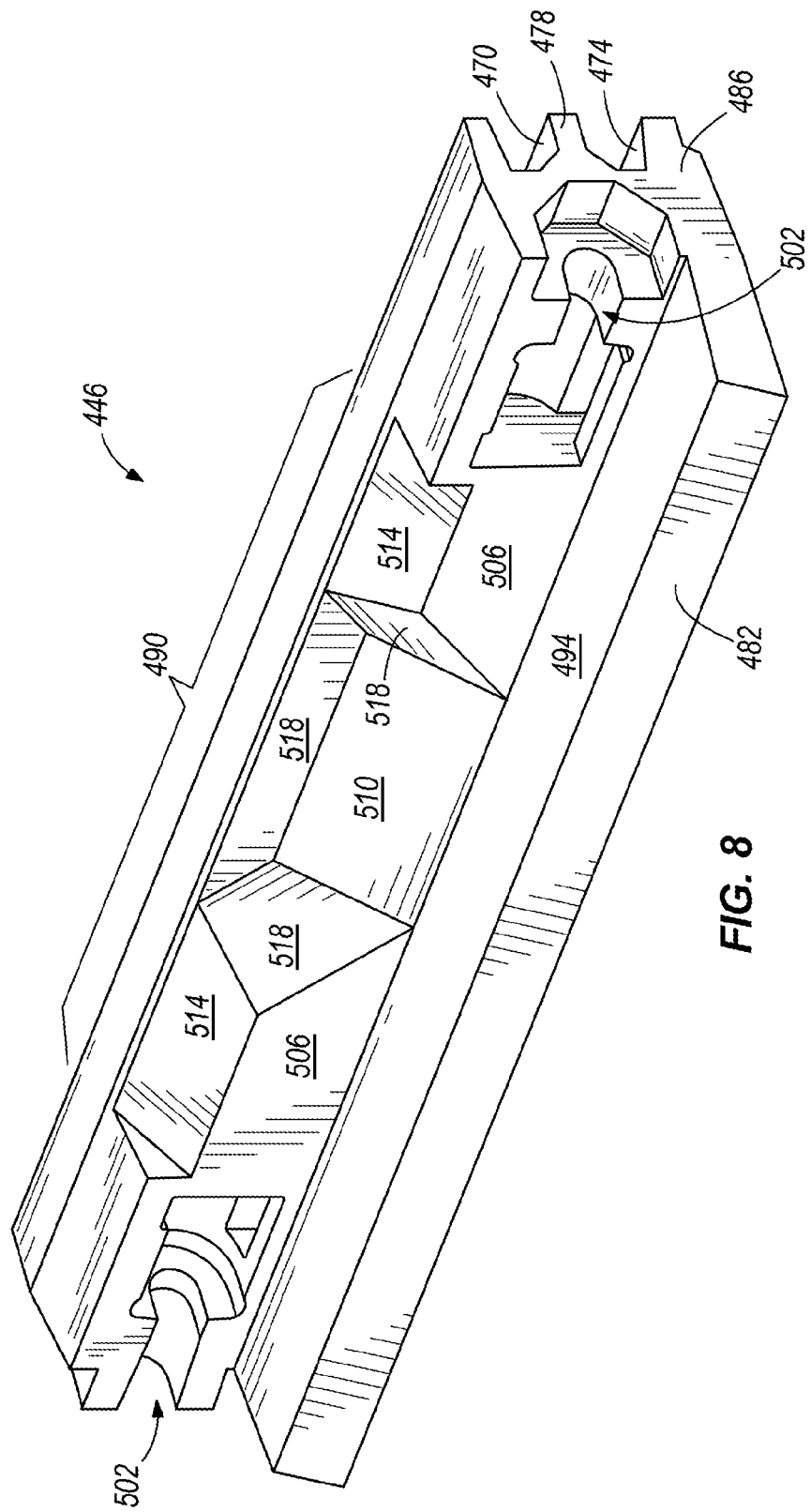
FIG. 8 is perspective view of an alternative construction of a linepan section.

FIG. 8 shows a face-side rail 446 having multiple angled portions (a "double dozer" profile) for a double dozer style linepan. The double dozer face-side rail 446 generally includes a toe-rider flange 482, a body portion 486, a loading portion 490, and two coupling portions 502. The toe-rider flange 482 defines flange surface 494 that slidingly supports the shoe 34. The body portion 486 defines conveyor recesses 470, 474 which extend into the body portion 486 toward the face 30. The body portion 486 also provides a conveyor pan portion 478. Coupling portions 502 are arranged to receive a locking key to connect adjacent double dozer face-side rails 446 together to form a continuous AFC.

The loading portion 490 defines a face-side surface 506, a primary loading surface 510, a secondary loading surface 514, and three connecting surfaces 518. The loading portion 490 acts to provide a ramp for material M to flow over the double dozer face-side rail 446 onto the conveyor.

Figure 9:
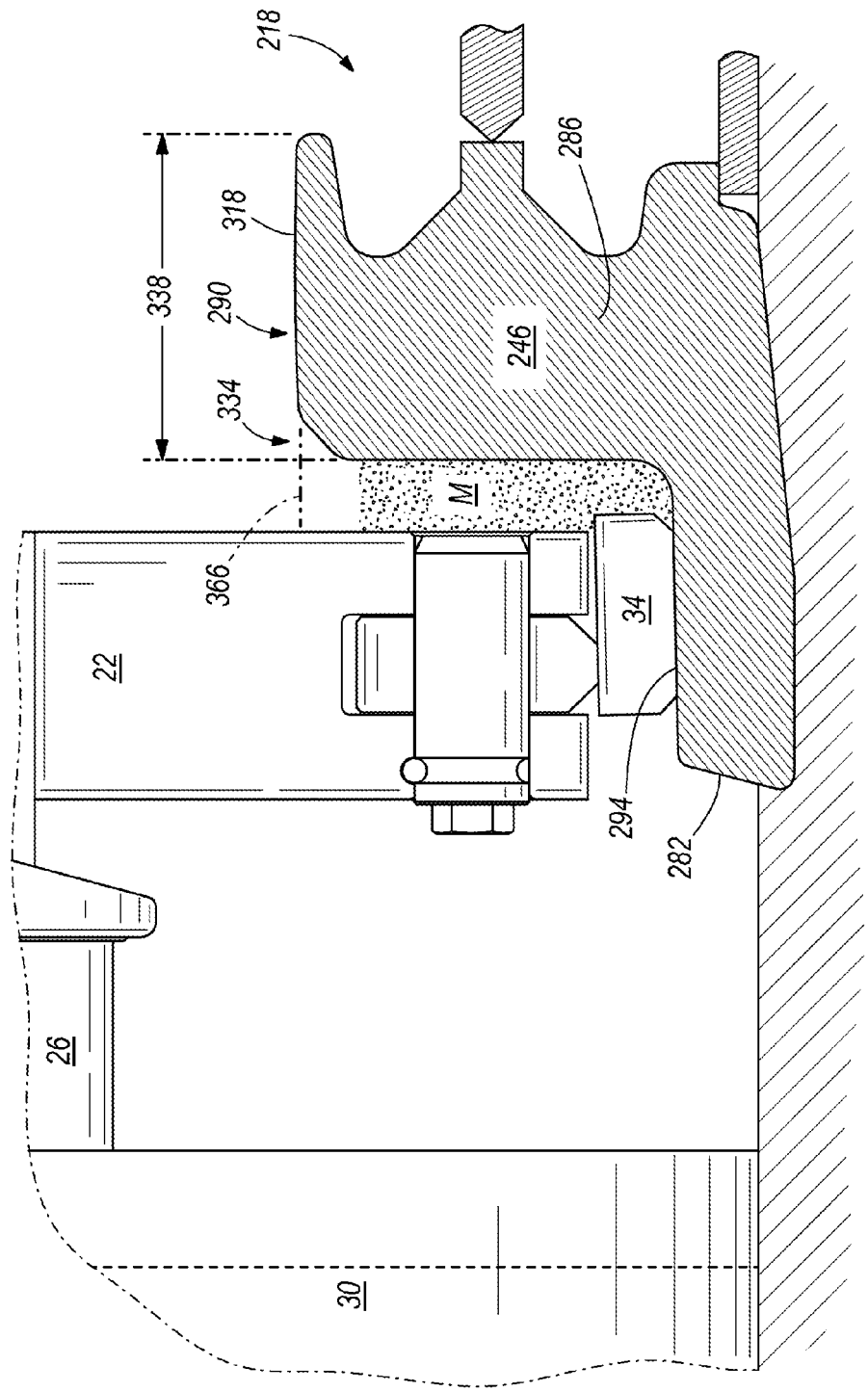
FIG. 9 is an end view of a portion of a prior art linepan section illustrating a prior art face-side rail with a portion of the mining machine.
Figure 10:
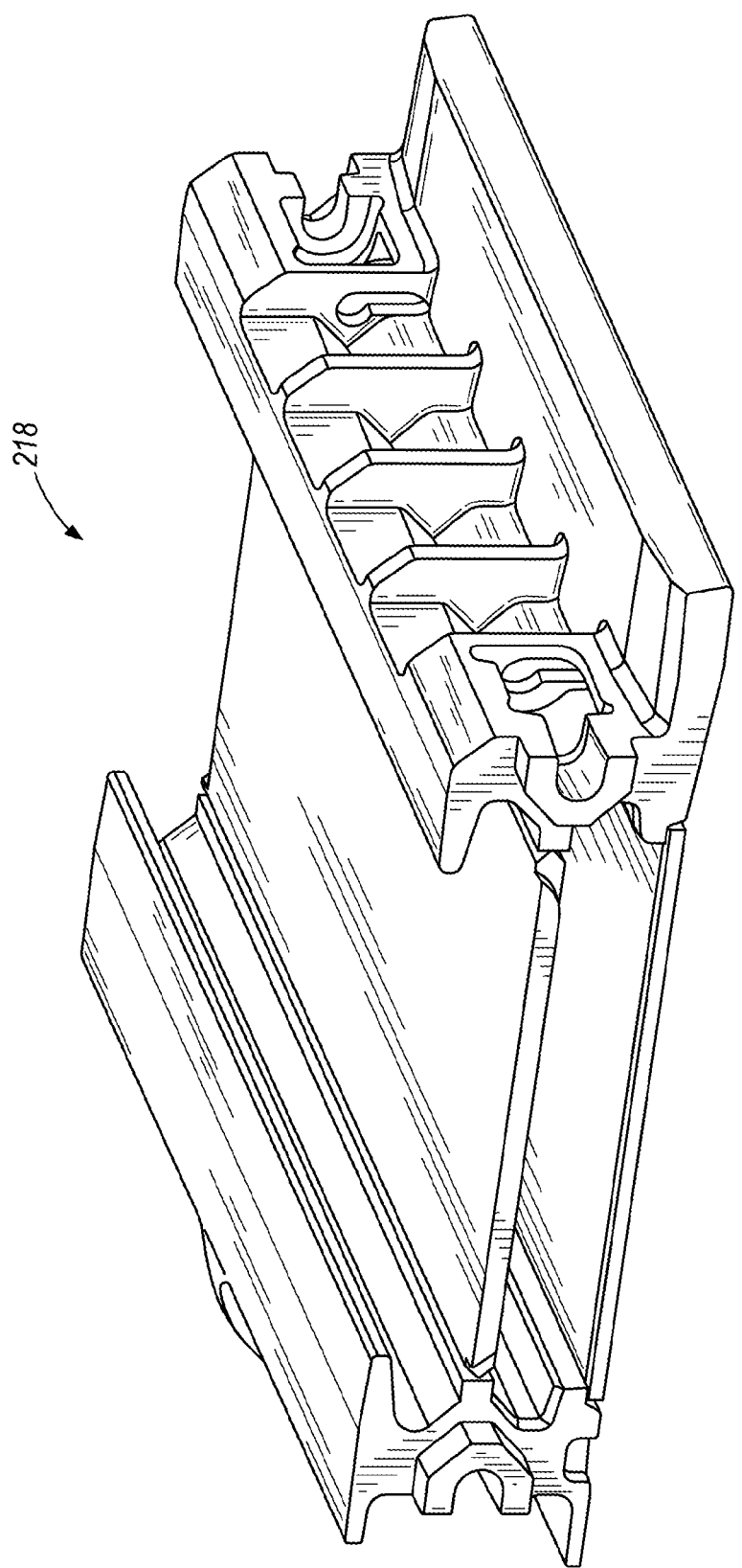
FIG. 10 is a perspective view of the prior art pan section shown in FIG. 9.

FIGS. 7 and 9 compare the loading portion 90 of the present linepan section 18 and with a corresponding portion 290 of a prior art linepan section 218, respectively. FIG. 10 is a perspective view of the prior art linepan section 218 to clarify the comparison. In FIG. 9, similar components have the same reference number plus 200.

With reference to FIGS. 7, 9, and 10, the total width 138 of the loading portion 90 of the present linepan section 18 is substantially the same as the total length 338 of the upper portion 290 of the prior art linepan section 218. However, the loading portion 90 of the linepan section 18 provides a relatively larger gap or loading aperture 170 between the face-side rail 46 and the shearer 22 such that a larger amount of material M may pass therethrough. The line pan section 18 provides an approximately five percent (5%) larger loading aperture 170 compared to that of the prior art line pan section 218. In contrast, in the prior art linepan section 218, the upper portion 290 occupies the comparable open space of the loading aperture 178 in the line pan section 18.

With the present linepan section 18, the height at the face-side end of the loading portion 90 (the loading height 162 at the loading face-side end 134) is relatively lower than the height at the corresponding location of the upper portion 290 (about the top surface height 366) of the prior art linepan section 218. With the reduced loading height 162, the height of the material M compacted against the face-side rail 46 is reduced.

What is claimed is:

1. A linepan section of a longwall mining machine positioned proximate a mining face and supported on a ground surface, the linepan section comprising:
   a face-side rail including a first end portion including a first coupling portion for connection to a linepan section adjacent a first end and a second end portion including a second coupling portion for connection to a linepan section adjacent a second end, the first end being opposite the second end, a toe rider flange for supporting the longwall mining machine for movement along the linepan section, a generally horizontal top surface with a top face-side end and a top gob-side end and being at a top surface height, and an angled loading surface extending between the first coupling portion and the second coupling portion, the loading surface extending from the top face-side end toward the mining face and toward the ground surface and being arranged at an oblique angle relative to the top surface, the loading surface defining a plane that does not intersect the toe rider flange, wherein the face-side rail is formed as a casting including the generally horizontal top surface, the angled loading surface, and the toe rider flange;

a gob-side rail opposite the face-side rail; and a conveyor pan between the face-side rail and the gob-side rail.

2. The linepan section of claim 1, wherein a top surface width is defined in a gob-to-face direction between the top gob-side end and the top face-side end, and wherein the loading surface has a loading face-side end, a loading surface width being defined in the gob-to-face direction between the top face-side end and the loading face-side end, a total width being defined in the gob-to-face direction between the top gob-side end and the loading face-side end, the loading surface width being at least about 25 percent of the total width.

3. The linepan section of claim 2, wherein the loading surface width is at least about 40 percent of the total width.

4. The linepan section of claim 2, wherein the loading surface width is about 48 percent of the total width.

5. The linepan section of claim 1, wherein the loading surface is angled relative to the top surface at between 25 and 55 degrees.

6. The linepan section of claim 5, wherein the loading surface is angled relative to the top surface at between 30 and 50 degrees.

7. The linepan section of claim 6, wherein the loading surface is angled relative to the top surface at about 45 degrees.

8. The linepan section of claim 1, wherein the loading surface has a loading face-side end at a loading height, wherein the toe-rider flange extends past the loading face-side end and defines a flange surface, a total height being defined between the flange surface and the top surface height, a loading surface height being defined between the flange surface and the loading height, the loading height being less than about 80 percent of the total height.

9. The linepan section of claim 8, wherein the loading height is less than about 75 percent of the total height.

10. The linepan section of claim 9, wherein the loading height is less than about 70 percent of the total height.

11. The linepan section of claim 1, wherein the face-side rail has a face surface directed towards the mining face and defines conveyor recesses in a surface opposite the face surface, the conveyor recesses extending a depth to a recess bottom surface, the top face-side end being positioned closer to the mining face than the recess bottom surface.

12. The linepan section of claim 1, wherein the face-side rail further includes a material cavity defined in a face surface below the loading surface, the material cavity being recessed from the loading face-side end toward a gob-side and extending past the top face-side end to a cavity bottom surface.

13. The linepan section of claim 12, wherein the loading surface bounds a top of the material cavity.

14. A longwall mining machine positioned proximate a mining face and supported on a ground surface, the machine comprising:

a shearer including a cutting head for cutting into the mining face, a body, a shoe, and a haulage assembly for moving the shearer along the mining face;

an armoured face conveyor including a plurality of linepan sections connected along the mining face, at least one of the plurality of linepan sections including a face-side rail including a first end portion including a first coupling portion for connection to a linepan section adjacent a first end and a second end portion including a second coupling portion for connection to a linepan section adjacent a second end, the first end being opposite the second end, a toe rider flange for supporting the shearer for movement along the linepan section, a generally horizontal top surface with a top face-side end and a top gob-side end and being at a top surface height, a top surface width being defined in a gob-to-face direction between the top gob-side end and the top face-side end, and an angled loading surface extending between the first coupling portion and the second coupling portion, the loading surface extending from the top face-side end toward the mining face and toward the ground surface and being arranged at an oblique angle relative to the top surface, the loading surface defining a plane that does not intersect the toe rider flange, wherein the face-side rail is formed as a casting including the generally horizontal top surface, the angled loading surface, and the toe rider flange, a gob-side rail opposite the face-side rail, and a conveyor pan between the face-side rail and the gob-side rail, and a conveyor traveling between the gob-side rail and the face-side rail to convey material along the conveyor pan;

a haulage member extending along the length of the mining face and engaged with the haulage assembly of the shearer; and an advancing assembly including a ram operable to advance the armoured face conveyor toward the mining face.

15. The machine of claim 14, wherein the loading surface has a loading face-side end, a loading surface width being defined in the gob-to-face direction between the top face-side end and the loading face-side end, a total width being defined in the gob-to-face direction between the top gob-side end and the loading face-side end, the loading surface width being between about 25 percent and about 55 percent of the total width.

16. The machine of claim 14, wherein the loading surface is angled relative to the top surface at between 25 and 55 degrees.

17. The machine of claim 14, wherein the loading surface has a loading face-side end at a loading height, wherein the toe-rider flange extends past the loading face-side end and defines a flange surface, a total height being defined between the flange surface and the top surface height, a loading surface height being defined between the flange surface and the loading height, the loading height being between about 80 percent and about 65 percent of the total height.

18. The machine of claim 14, wherein the face-side rail further includes a material cavity defined in a face surface below the loading surface, the material cavity being recessed from the loading face-side end toward a gob-side and extending past the top face-side end to a cavity bottom surface.

19. The machine of claim 14, wherein the plurality of linepan sections includes at least another linepan section including
 a face-side rail including
  a first end portion including a first coupling portion for connection to a linepan section adjacent a first end and a second end portion including a second coupling portion for connection to a linepan section adjacent a second end, the first end being opposite the second end,
  a toe rider flange for supporting the shearer for movement along the linepan section,
  a generally horizontal top surface with a top face-side end and a top gob-side end and being at a top surface height,
  an angled loading surface extending between the first coupling portion and the second coupling portion, the loading surface extending from the top face-side end toward the mining face and toward the ground surface and being arranged at an oblique angle relative to the top surface,
  a material cavity defined in a face surface below the loading surface, the material cavity being recessed from the loading face-side end toward a gob-side and extending past the top face-side end to a cavity bottom surface,
 a gob-side rail opposite the face-side rail, and
 a conveyor pan between the face-side rail and the gob-side rail.

20. A linepan section of a longwall mining machine positioned proximate a mining face and supported on a ground surface, the linepan section comprising:
 a face-side rail having
  a first end portion including a first coupling portion for connection to a linepan section adjacent a first end and a second end portion including a second coupling portion for connection to a linepan section adjacent a second end, the first end being opposite the second end,
  a generally horizontal top surface with a top face-side end and a top gob-side end and being at a top surface height, a top surface width being defined in a gob-to-face direction between the top gob-side end and the top face-side end,
  an angled loading surface extending between the first coupling portion and the second coupling portion, the loading surface extending from the top face-side end toward the mining face and toward the ground surface and being arranged at an oblique angle relative to the top surface, the loading surface having a loading face-side end at a loading height, a loading surface width being defined in the gob-to-face direction between the top face-side end and the loading face-side end, a total width being defined in the gob-to-face direction between the top gob-side end and the loading face-side end, the loading surface width being at least about 25 percent of the total width,
  a material cavity defined in a face surface of the face-side rail below the loading surface and recessed from the loading face-side end toward a gob-side and extending past the top face-side end to a cavity bottom surface,
  conveyor recesses defined in a surface opposite the face surface and extending a depth to a recess bottom surface, the top face-side end being positioned closer to the mining face than the recess bottom surface, and
  a toe rider flange for supporting the longwall mining machine for movement along the linepan section, the toe-rider flange extending toward the mining face from a bottom edge of the material cavity, the toe-rider flange extending past the loading face-side end and defining a flange surface, a total height being defined between the flange surface and the top surface height, a loading surface height being defined between the flange surface and the loading height, the loading height being less than about 80 percent of the total height,
  wherein die loading surface defines a plane that does not intersect the toe rider flange, and
  wherein the face-side rail is formed as a casting including the generally horizontal top surface, the angled loading surface, and the toe rider flange;
 a gob-side rail opposite the face-side rail; and
 a conveyor pan between the face-side rail and the gob-side rail.

* * * * *

UNITED STATES PATENT AND TRADEMARK OFFICE
CERTIFICATE OF CORRECTION

PATENT NO. : 8,820,849 B2  
APPLICATION NO. : 13/480729  
DATED : September 2, 2014  
INVENTOR(S) : Ron Vasey and Adrian Jones Page 1 of 1

It is certified that error appears in the above-identified patent and that said Letters Patent is hereby corrected as shown below:

In the Claims

Column 10, claim 20, line 39: replace the word "die" with the word --the--

Signed and Sealed this  
Third Day of February, 2015

Michelle K. Lee  
*Deputy Director of the United States Patent and Trademark Office*